No. 889,398. PATENTED JUNE 2, 1908.
C. C. PALMER.
ROTARY COMPRESSOR.
APPLICATION FILED NOV. 14, 1905.
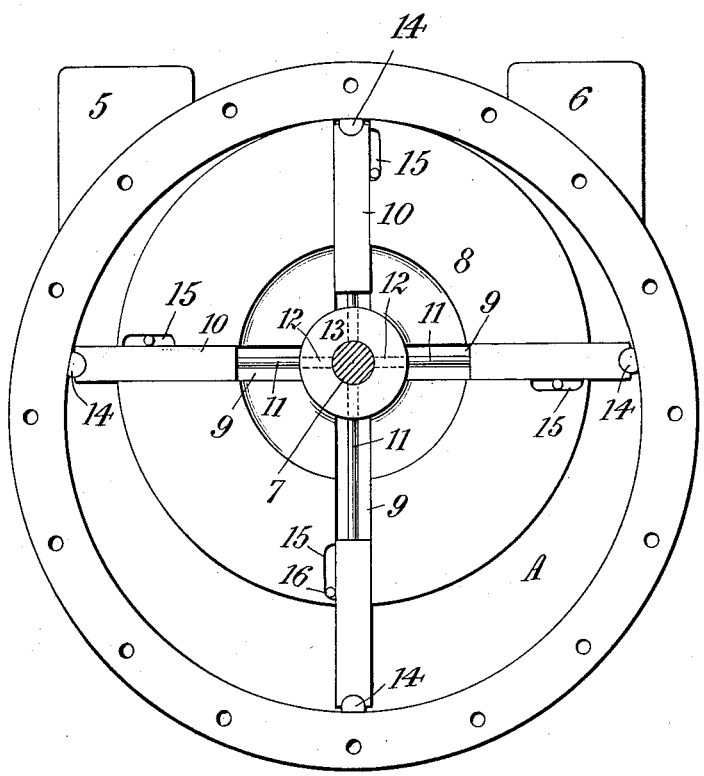

UNITED STATES PATENT OFFICE.

CASSIUS CLAY PALMER, OF NEW YORK, N. Y.

ROTARY COMPRESSOR.

No. 889,398.	Specification of Letters Patent.	Patented June 2, 1908.

Application filed November 14, 1905. Serial No. 287,219.

*To all whom it may concern:*

Be it known that I, CASSIUS CLAY PALMER, a citizen of the United States, and a resident of New York city, in the county of New York, borough of Manhattan, and State of New York, have invented certain new and useful Improvements in Rotary Compressors, of which the following is a specification.

My present invention relates to rotary compressors and has particular application to means for relieving and reducing the friction exercised by the sliding piston blades within the casing of the compressor.

To the accomplishment of this end my invention consists in the construction, combination and arrangement of parts set forth in and falling within the scope of the appended claims.

The accompanying drawing, illustrative of my invention, is a view in elevation of a compressor embodying my improvement, a portion of the casing thereof being removed to show the interior construction.

As is well known, in compressors or engines embodying the principle of the radially sliding blades, considerable friction is produced by the sliding movement of the blades in the sockets or slots formed in the rotating piston disk, with the consequent result that the efficiency of the engine is reduced and the period of usefulness of the same considerably curtailed. It is my intention to obviate this difficulty by grooving or slotting the body of the piston disk and placing therein an antifriction device, such as a pawl roller bearing against which the sliding pistons may work in their reciprocation.

Referring now to the accompanying drawing in detail, A indicates the casing of a compressor adapted particularly for use in connection with refrigerating apparatus. This casing is approximately circular in contour and is provided with an inlet 5 and an outlet 6.

The numeral 7 designates the power shaft of the engine which is eccentrically and rotatably mounted in the casing in any well known manner. The piston disk which is shown at 8 is keyed to the shaft and is provided with radially extending slots or ways 9 within which are designed to slide the piston blades 10, said blades in the present instance being secured to rods or stems 11, 11 moving in and out of small sockets 12 formed in the hub 13 of the piston disk 8. The heads of the piston, or the surfaces which bear against the interior wall of the casing, are shown at 14. In order to reduce the friction of the piston blades in reciprocating in the slots or ways, I cut or groove a portion of the wall adjacent to each way, as is shown at 15, and place within such wall an anti-friction roller or bearing 16, which is free to travel the length of the slot according to the movement of the piston blade passing over the same. By this construction a highly efficient, durable, and easy running engine is provided and one especially adapted for compressing fluid in refrigerating devices.

Having thus described my invention, what I claim as new and desire to secure by Letters Patent is:—

In a rotary compressor, the combination of a casing having inlet and outlet portions, a rotating shaft eccentrically mounted therein, a rotary piston disk carried by said shaft and having slots or ways formed therein, pistons sliding in said slots or ways, and antifriction rollers located in grooves or slots cut in the wall of the piston disk adjacent to the periphery of such disk and communicating with the piston slots or ways, said pistons being adapted to bear against said anti-friction rollers in their reciprocating movement.

In testimony whereof I have signed my name to this specification in the presence of two subscribing witnesses.

CASSIUS CLAY PALMER.

Witnesses:
RICHARD B. CAVANAGH,
JOS. J. PIERANDO.